Figure 3:
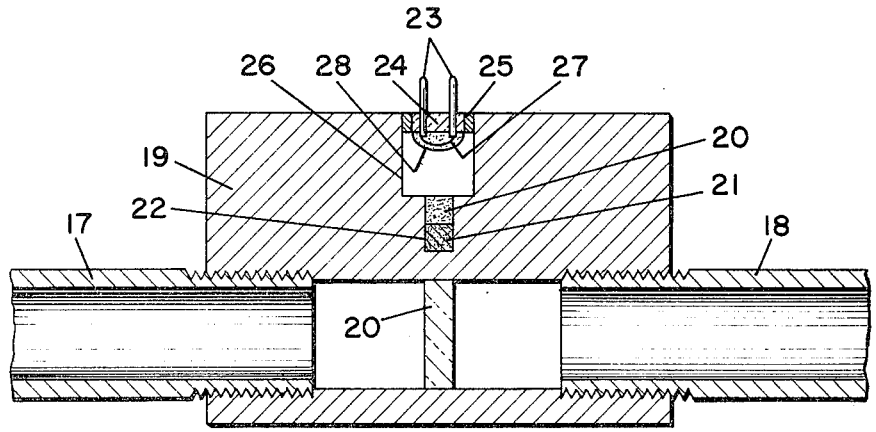
Figure 4:
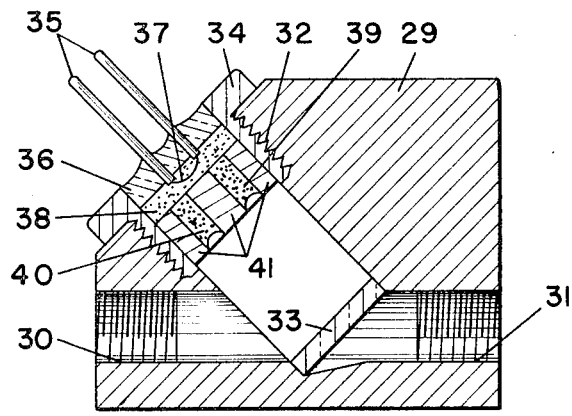

United States Patent

Moyant

[15] 3,670,925
[45] June 20, 1972

[54] EXPLOSIVELY ACTIVATED GLASS VALVE

[72] Inventor: Donald A. Moyant, Phoenixville, Pa.

[73] Assignee: Atlas Chemical Industries, Inc., Wilmington, Del.

[22] Filed: Oct. 28, 1969

[21] Appl. No.: 871,923

[52] U.S. Cl. .................................... 222/3, 137/68, 220/47
[51] Int. Cl. ................................................. B67b 7/00
[58] Field of Search ....................... 220/47, 89 A; 137/67–71; 169/9; 222/3, 5

[56] References Cited

UNITED STATES PATENTS

| | | | |
|---|---|---|---|
| 2,441,011 | 5/1948 | Dodelin | 222/5 |
| 3,567,245 | 3/1971 | Ekstrom | 137/68 |
| 2,408,774 | 10/1946 | Goddard et al. | 220/47 X |
| 2,478,958 | 8/1949 | Wheeler et al. | 220/47 |
| 2,691,459 | 10/1954 | Whitmore | 220/89 A X |
| 2,736,459 | 2/1956 | Cockram et al. | 220/47 X |
| 2,797,760 | 7/1957 | Mathisen | 169/9 |
| 3,088,478 | 5/1963 | Schimmel | 137/68 |
| 3,191,533 | 6/1965 | Hopson | 137/68 X |
| 3,196,610 | 7/1965 | Anderson | 137/68 X |
| 3,264,079 | 8/1966 | McKelvey | 65/114 X |

Primary Examiner—M. Cary Nelson
Assistant Examiner—Richard Gerard
Attorney—Kenneth E. Mulford and Roger R. Horton

[57] ABSTRACT

A valve having an internally stressed, hermetically sealed glass barrier to the passage of fluids. An explosive charge opens the valve by pulverizing the glass barrier. Three embodiments are disclosed: a charge imbedded in the glass, a shaped charge directed at the glass, and a charge placed near the edge of the glass outside the conduit for the fluid.

13 Claims, 4 Drawing Figures

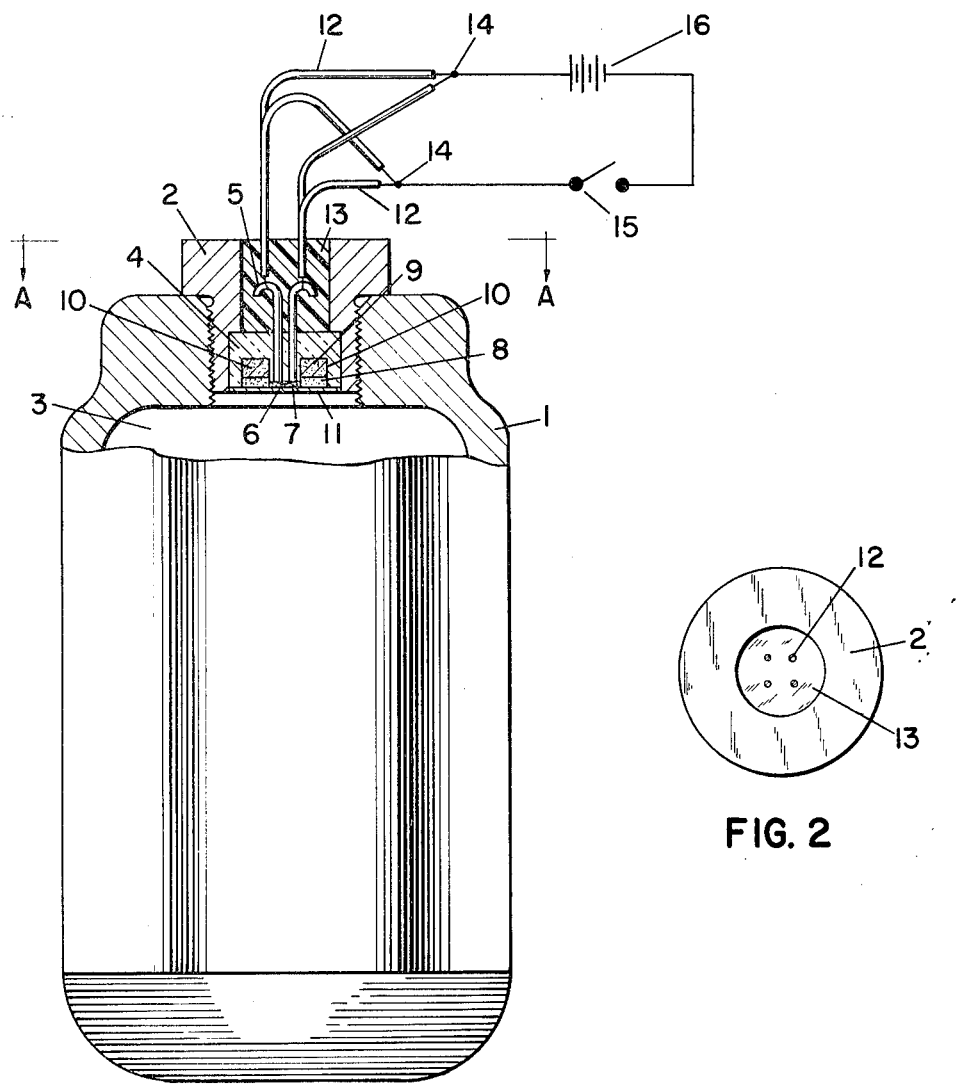

INVENTOR

Donald A. Moyant

BY *Richard D. Thuerle*

ATTORNEY

EXPLOSIVELY ACTIVATED GLASS VALVE

This invention relates to a valve having an internally stressed, hermetically sealed glass barrier which is pulverized by an explosive charge.

BACKGROUND OF THE INVENTION

There are certain applications for valves where the valve must be capable of opening extremely rapidly. For example, a new safety device for automobiles (see U.S. Pat. No. 3,441,290) inflates a balloon in front of the driver as soon as it senses that the car has struck something. Since the balloon must be inflated before the driver flies into the windshield, the gas used to inflate the balloon must be stored under very high pressure (about 5,000 psi) and the valve which releases the gas must be capable of opening completely in an extremely short period of time, preferably less than 5 milliseconds. In addition, the valve must be capable of containing a gas under 5,000 psi of pressure for long periods of time, at least a year, without leaking so that the pressure does not decrease. If a safety device of this sort is to be mass-produced for automobiles, the valve must also be highly reliable and inexpensive to manufacture. Valves currently available do not meet all of these stringent and extreme requirements.

ADVANTAGES OF THE INVENTION

The valves of this invention are of a simple construction and can be inexpensively made since they have no moving parts and no precision parts. They may be made to provide a hermetic seal for fluids pressurized at about 5,000 psi. Yet, they may be made to open reliably within an extremely short period of time; valves opening in less than 2 milliseconds have been constructed. Other advantages will be discussed with the particular embodiments of the invention.

DESCRIPTION OF THE INVENTION

The valves of this invention have a conduit for the passage of a fluid, i.e., a liquid or a gas. Across the conduit preventing the fluid from flowing is an internally stressed, hermetically sealed glass barrier, where "hermetic" means gas-tight. This hermetic seal may be formed, for example, by a compression seal process or a matched seal process.

In the compression seal process, which is the preferred process for forming a mechanically rugged hermetic seal, a disc of glass is positioned in the conduit and the conduit and the glass are heated to the melting point of the glass. They are then cooled which solidifies the glass. The glass and the metal conduit are selected so that the coefficient of thermal expansion of the conduit is greater than that of the glass. Thus, as the glass solidifies and cools, the metal conduit exerts a compressive force on it producing internal stresses in the glass. Examples of glasses which are suitable for forming compression seals with metals such as steel include potash-soda-barium and soda-lime.

The matched seal is formed in a similar fashion except that the glass and the metal conduit have the same coefficient of thermal expansion. The glass in the matched seal is chemically bonded to the metal conduit and, since they both have the same coefficient of thermal expansion, intimate contact is maintained over a wide range of temperatures. The glass can be internally stressed by rapidly cooling the melted glass. Borosilicate glass is an example of a glass which is suitable for making a matched seal with a metal such as steel.

An explosive charge is positioned so that on detonation it will pulverize the glass barrier. I have found that, when an internally stressed hermetic seal is used, the glass is pulverized by the explosion so that it has the appearance of fine sand and is not splintered nor does it have cutting edges. For many applications, such as the automobile balloon example previously mentioned, the pulverized glass can be completely ignored. Being inert, it does not react with the fluid and it is too fine to plug up the conduit. However, a filter may be placed downstream in the conduit to catch the glass if desired.

Preferably, the explosive charge is in contact with the glass barrier so as to instantly disintegrate the barrier on detonation. However, the charge may also be positioned outside of the conduit or imbedded in the conduit near the edge of the glass barrier; upon detonation the force of the explosive is transferred through the conduit without rupturing it and shatters the glass barrier. In a third variation, the explosive charge is a shaped charge which is directed at the glass barrier without actually contacting it.

The explosive charge may be of any desired composition. Examples of suitable explosives include lead azide, PETN, HMX, RDX, and tetryl; RDX is preferred.

The charge may be fired by a variety of methods such as with a mechanical primer, for example, a percussion primer or a stab primer, or it may be heated with a laser, a flame, or a hotwire; the charge is preferably electrically activated as, for example, with an electric match.

DRAWINGS

FIGS. I, II, III, and IV diagrammatically show three embodiments of this invention.

FIG. I, a side elevation partly in section of the preferred embodiment, which can be used in the automobile safety device described previously, shows a canister closed with a valve having the explosive charge imbedded in the glass.

FIG. II is a cross-sectional view through A-A of FIG. I.

FIG. III shows a cross-sectional view of a valve at the juncture of two pipes where the explosive charge is imbedded in the conduit in line with the edge of the glass.

FIG. IV shows a cross-sectional view of a valve where a shaped charge is directed at a glass barrier.

In FIGS. I and II, a steel canister 1 having steel flange 2 screwed into its mouth is filled with gas 3 under high pressure. Glass 4 having four wire pins 5 imbedded therein is hermetically sealed, preferably by a compression seal, to flange 2. Two bridgewires 6, which each join two of the two pins, is coated with a primer 7, preferably KDNBF, although lead styphnate, LMNR, etc., could also be used. The explosive charge consists of primary explosive 8, preferably lead azide, and a secondary explosive 9, preferably RDX; explosives 8 and 9 fill two cylindrical voids 10 in glass seal 4. A thin metal disc 11 of steel is glued or welded to the flange 2 and holds the explosive charge in place and protects it. Four wires 12 are soldered to pins 5; insulating material 13, for example, an epoxy, silastic, or static shunt mix, fills the insides of the flange. The wires 12 are joined in pairs at 14 so that, when switch 15 is closed, current from power source 16 flows through both bridgewires. The bridgewires are heated which sets off the primer which, in turn, detonates explosive charges 8 and 9; the glass barrier 4 is pulverized and the gas 3 escapes through the opening in the flange. Two bridgewires are used to insure the firing of the valve.

In FIG. III, two pipes 17 and 18 are threaded into conduit 19. A glass barrier 20 is hermetically sealed under stress to conduit 19. A primary explosive 20 and a secondary explosive 21 fill cylindrical void 22 in conduit 19. Two wires 23 are held in place by glass seal 24 in a metal ring 25 which is pressed into cylindrical hole 26. The wires 23 are joined by bridgewire 27 which is coated with a primer 28. When the charges are detonated, the force is transmitted through the conduit without rupturing it and pulverizes the glass barrier. This embodiment has the advantage that the gases and debris produced by the explosion do not enter the conduit.

In FIG. IV, block 29 provided with threaded recesses 30, 31, and 32 forms the conduit. A glass barrier 33 is hermetically sealed under stress to block 29, preventing a fluid from flowing from the right to the left. A plug 34 is screwed into threaded recess 32. In plug 34 pins 35 are supported by glass seal 36. Pins 35 are joined by bridgewire 37 which is imbedded in primer 38. Two cylindrical charges 39 and 40 are held by supporting material 41. Passing a current through the bridgewire sets off the primer which, in turn, detonates the shaped charges. The directed Monroe-effect blast pulverizes the glass barrier. This arrangement has the advantage that the glass is struck directly by the explosive force thus resulting in pulverized glass fragments somewhat smaller than those which result from the embodiment shown in FIG. II.

What is claimed is:

1. A valve comprising (1) a metal conduit for the passage of a fluid; (2) a glass barrier forming a hermetic seal to the passage of said fluid through said metal conduit, said barrier being sufficiently internally stressed so that when shattered it will be pulverized; and (3) an explosive charge positioned to shatter said barrier when detonated.

2. The valve of claim 1 wherein said explosive charge is electrically activated.

3. The valve of claim 2 wherein said explosive charge is electrically activated through a bridgewire.

4. The valve of claim 1 wherein said explosive charge is in contact with said glass barrier.

5. The valve of claim 1 wherein said explosive charge is a shaped charge and is directed at said glass barrier.

6. The valve of claim 1 wherein said explosive charge is positioned near the edge of said glass barrier in contact with said conduit so that the force of said explosive charge when detonated is transmitted to the edge of said glass barrier through said conduit.

7. The valve of claim 1 wherein said glass barrier is a compression seal.

8. The valve of claim 1 wherein said glass barrier is a matched glass-to-metal seal.

9. A canister comprising (1) a metal container having a mouth; (2) a metal plug threadedly engaged with said mouth of said container in a hermetic relationship therewith, said plug having conduit therethrough; (3) a glass barrier forming a hermetic seal to the passage of a fluid through said conduit, said barrier being sufficiently internally stressed so that when shattered it will be pulverized; (4) at least one pair of metal pins passing through said barrier in a hermetic relationship therewith; (5) a bridgewire connecting the pins in each pair of said pins inside said container; and (6) an explosive charge positioned in detonating relationship to each bridgewire.

10. A canister according to claim 9 wherein said fluid within said container is a compressed gas.

11. A canister according to claim 9 wherein two pairs of pins pass through said barrier.

12. The canister of claim 9 wherein said glass barrier is a compression seal.

13. A canister of claim 9 wherein said glass barrier is a matched glass-to-metal seal.

* * * * *